(12) United States Patent
Kamatani

(10) Patent No.: US 8,987,969 B2
(45) Date of Patent: Mar. 24, 2015

(54) STATOR AND MANUFACTURING METHOD THEREOF

(75) Inventor: Hideki Kamatani, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 351 days.

(21) Appl. No.: 13/131,838

(22) PCT Filed: Sep. 30, 2009

(86) PCT No.: PCT/JP2009/066995
§ 371 (c)(1),
(2), (4) Date: May 27, 2011

(87) PCT Pub. No.: WO2011/039850
PCT Pub. Date: Apr. 7, 2011

(65) Prior Publication Data
US 2011/0227443 A1   Sep. 22, 2011

(51) Int. Cl.
*H02K 15/04* (2006.01)
*H02K 15/06* (2006.01)
*H02K 3/28* (2006.01)
(Continued)

(52) U.S. Cl.
CPC .. *H02K 3/12* (2013.01); *H02K 3/28* (2013.01); *H02K 15/0068* (2013.01); *H02K 15/0478* (2013.01); *H02K 2213/03* (2013.01)
USPC ........... 310/207; 310/208; 310/198; 310/184; 310/201

(58) Field of Classification Search
CPC ................................. H02K 3/28; H02K 3/12
USPC .......................... 310/207, 208, 198, 184, 201
See application file for complete search history.

(56) References Cited

U.S. PATENT DOCUMENTS 1,796,422 A * 3/1931 Apple ........................... 310/201
5,886,444 A * 3/1999 Enomoto et al. .............. 310/208
(Continued)

FOREIGN PATENT DOCUMENTS

JP   2000-069700 A   3/2000
JP   2002-345216 A   11/2002
(Continued)

OTHER PUBLICATIONS

International Search Report of PCT/JP2009066995 dated Jan. 12, 2010.

*Primary Examiner* — Terrance Kenerly
(74) *Attorney, Agent, or Firm* — Kenyon & Kenyon LLP

(57) ABSTRACT

The invention has an object to provide a stator including coils that protrude less in the radial direction of the stator and can be made smaller in the radial direction of the stator, and a method of manufacturing the same. In the stator, the conductor having a rectangular cross section is formed in a continuous meandering fashion, the conductor including: a plurality of in-slot portions arranged inside a slot of the stator such as to be overlapped with one another in a circumferential direction of the stator with long sides of the rectangle being oriented along a radial direction of the stator; a plurality of circumferential portions arranged at a coil end such as to be overlapped with one another in the radial direction of the stator with short sides of the rectangle oriented along the radial direction of the stator; a bent portion connecting the in-slot portion and the circumferential portion; and a twisted portion formed in the bent portion, the bent portion including a first bend formed on a side of the circumferential portion and a second bend formed on a side of the in-slot portion.

7 Claims, 20 Drawing Sheets

(51) Int. Cl.
*H02K 3/12* (2006.01)
*H02K 15/00* (2006.01)

(56) References Cited

U.S. PATENT DOCUMENTS

| | | | | |
|---|---|---|---|---|
| 8,093,777 | B2 * | 1/2012 | Stiesdal | 310/198 |
| 8,174,160 | B2 * | 5/2012 | Stiesdal | 310/198 |
| 2001/0019234 | A1 * | 9/2001 | Murakami et al. | 310/180 |
| 2002/0036439 | A1 * | 3/2002 | Ooiwa | 310/207 |
| 2004/0017125 | A1 * | 1/2004 | Nakamura et al. | 310/201 |
| 2005/0046297 | A1 * | 3/2005 | Chen et al. | 310/180 |
| 2005/0206263 | A1 * | 9/2005 | Cai et al. | 310/198 |
| 2006/0066167 | A1 * | 3/2006 | Saito et al. | 310/201 |
| 2007/0145852 | A1 * | 6/2007 | Schon et al. | 310/180 |
| 2008/0007133 | A1 * | 1/2008 | Onimaru et al. | 310/208 |

FOREIGN PATENT DOCUMENTS

| | | |
|---|---|---|
| JP | 2003-189521 A | 7/2003 |
| JP | 2006-101654 A | 4/2006 |
| JP | 2006-158045 A | 6/2006 |
| JP | 2008-048488 A | 2/2008 |
| JP | 2008-109737 A | 5/2008 |
| JP | 2009-011152 A | 1/2009 |
| JP | 2009-033831 A | 2/2009 |
| JP | 2010-178458 A | 8/2010 |

* cited by examiner

FIG. 2

| | | SLOT 1~6 | SLOT 7~12 | SLOT 13~18 | SLOT 19~24 | SLOT 25~30 | SLOT 31~36 | SLOT 37~42 | SLOT 43~48 |
|---|---|---|---|---|---|---|---|---|---|
| UAXX | Lead side | −3.5 | −3.5 | 5.5 | ↓ | ↓ | ↓ | ↓ | 5.5 |
| | Non-lead side | −3.5 | 5.5 | 5.5 | ↓ | ↓ | ↓ | ↓ | 5.5 |
| UCXX | Lead side | −3.5 | −3.5 | 3.5 | ↓ | ↓ | ↓ | ↓ | 3.5 |
| | Non-lead side | −3.5 | 3.5 | 3.5 | ↓ | ↓ | ↓ | ↓ | 3.5 |

STATOR AND MANUFACTURING METHOD THEREOF

CROSS-REFERENCE TO RELATED APPLICATIONS

This is a national phase application based on the PCT International Patent Application No. PCT/JP2009/066995 filed on Sep. 30, 2009, the entire contents of which are incorporated herein by reference.

TECHNICAL FIELD

The present invention relates to a distributed winding stator used for a motor or the like and a method of manufacturing the same. More particularly, the invention relates to a stator with multi-phase coils formed of conductors having a rectangular cross section, and a method of manufacturing the same.

BACKGROUND ART

Stators used for motors or the like have coils therein. One known stator coil is a wave winding coil, in which conductors are wound in a wave form. One such wave winding coil is disclosed, for example, in Patent Literature 1. The wave winding coil disclosed therein is a multi-phase wave winding coil for an electric rotating machine, including coil conductors of respective phases wound in a wave form, the coil conductors being made up of slot portions consisting of forward portions and backward portions alternately passed through slots of a core, and bridging portions integrally formed with the slot portions and connecting the ends on the same side of the forward portions and backward portions to form coil ends. The bridging portion includes an overlapping portion radially overlapping with other circumferentially adjoining bridging portions and a distal end portion axially protruding further than the overlapping portion. One end and the other end of the distal end portion of the bridging portion are radially displaced generally by more than a radial thickness of the bridging portion. Namely, plural wave winding coils formed by winding conductors in a wave form are prepared, and overlapped with an offset of a certain pitch, to form the coil. The coil end space and resistance power loss are thereby reduced.

CITATION LIST

Patent Literature

Patent Literature 1: JP 2000-069700A

SUMMARY OF INVENTION

Technical Problem

Although not explicitly described in the patent literature 1 mentioned above, the plural wave winding coils cannot simply be overlapped with each other, and a process of successively interweaving two wave winding coils is essential. There was thus the problem of lowered production efficiency.

If the successive interweaving process is not to be employed, coil end connections across slots will have to be long and require a three-dimensional arrangement of long conductors as they bridge across other phases, resulting in large coil ends.

Accordingly, the present applicants have proposed a stator and a coil cage in which coils need not be interwoven at coil ends so that production efficiency can be increased (Japanese Patent Application No. 2009-016549).

However, in the above proposed technique, as shown in FIG. 21, when conductors are overlapped with each other to form the coil cage, bends of conductors interfere with each other at coil ends. Because of this, two layers are formed at the lane portion of conductors, which takes up unnecessary space at coil ends, and makes the coil protrude in the radial direction of the stator (toward the back yolk), leading to an increase in size in the radial direction of the stator.

The present invention was thus devised to solve the above-described problem and has an object to provide a stator including coils that protrude less in the radial direction of the stator and can be made smaller in the radial direction of the stator, and a method of manufacturing the same.

Solution to Problem

To achieve the above purpose, one aspect of the present invention provides a stator comprising a coil formed of a conductor having a rectangular cross section, wherein the conductor is formed in a continuous meandering fashion, the conductor including: a plurality of in-slot portions arranged inside a slot of the stator such as to be overlapped with one another in a circumferential direction of the stator with long sides of the rectangle being oriented along a radial direction of the stator; a plurality of circumferential portions arranged at a coil end such as to be overlapped with one another in the radial direction of the stator with short sides of the rectangle oriented along the radial direction of the stator; a bent portion connecting the in-slot portion and the circumferential portion; and a twisted portion formed in the bent portion, the bent portion including a first bend formed on a side of the circumferential portion and a second bend formed on a side of the in-slot portion.

In this stator, since the bent portion includes a first bend formed on the side of the circumferential portion and a second bend formed on the side of the in-slot portion, when the coil is overlapped with another coil, bends of conductors do not interfere with each other at coil ends so that the lane portion can be made in one layer. Thereby, the coils protrude less in the radial direction of the stator (toward the back yolk), and can be made smaller in the radial direction of the stator.

Plural in-slot portions can be overlapped in the circumferential direction such that their cross-sectional long sides are oriented in the radial direction of the stator inside the slots, which enables in-slot portions of different phases to be arranged at positions where they do not interfere with each other, meaning that the conductors be connected across slots in a shortest path. This, combined with the fact that plural circumferential portions are arranged at coil ends such that their cross-sectional short sides overlap with each other in the circumferential direction of the stator, minimizes space taken up at coil ends, and therefore the coil ends can be made small. Also, since there is no need to interweave coils at coil ends, production efficiency can be increased.

In the stator described above, preferably, the first bend is formed so that a bending angle θ1 is θ1<90°, and the bending angle θ1 and a bending angle θ2 of the second bend satisfy a relationship of θ1+θ2=90°.

Thereby, bends of conductors do not interfere with each other at coil ends, and the coil end height is reduced. Therefore, the coils can be made smaller in radial and height directions at coil ends.

The bending angle θ1 of the first bend is preferably 30°≤θ1≤60°. If the bending angle θ1 is less than 30° (θ1<30°), the minimum distance (distance d shown in FIG. 4)

across slots becomes too large, which increases the possibility of interference between twisted portions formed at ends of in-slot portions located in adjacent slots, in which case the coil end height could not be reduced. On the other hand, if the bending angle θ1 is more than 60° (θ1>60°), then, while twisted portions are unlikely to interfere with each other, it will be harder to make the lane portion in one layer, and also the coil end height cannot be reduced.

It should be noted here that in the coils installed in the stator described above, bent portions of conductors are bent in opposite directions at respective coil ends. Therefore, when coils are overlapped, while the bent portions do not intersect each other at one coil end (for example on the lead side), they intersect each other at the other coil end (for example on the non-lead side).

Accordingly, in the stator described above, preferably, the second bend at one coil end is formed by tilting down the bent portion toward the stator after the twisted portion has been formed.

At one coil end, since the bent portions do not intersect each other when coils are overlapped, the second bend can be formed by tilting down the bent portion toward the stator after the twisted portion has been formed. By tilting down the bent portion, bends of conductors can be separated from each other so as not to interfere with each other without subjecting twisted portions and the surroundings thereof to an excessive force. Thereby, the coils can be made to protrude less in the radial direction of the stator without damaging the enamel on the conductors (without deteriorating insulation performance).

In the stator described above, preferably, the second bend at the other coil end is formed by bending the conductor edgewise before the twisted portion is formed.

Since the bent portions intersect each other at the other coil end, the conductor cannot be tilted down. Therefore, the second bend is formed by bending the conductor edgewise before the twisted portion is formed. That is, the conductor is bent edgewise in two steps to form the first bend and second bend, so that bends of conductors do not interfere with each other when coils are overlapped at the other coil end. Thereby the coils can be made to protrude less in the radial direction of the stator at the other coil end, too.

Another aspect of the present invention to achieve the above purpose provides a method for manufacturing a stator comprising a coil formed of a conductor having a rectangular cross section, the method comprising the steps of: bending the conductor edgewise at an angle smaller than 90°; and twisting a portion of the conductor that has undergone the bending step and is to be positioned inside a slot of the stator, the bending step including edgewise bending a portion of the conductor that is positioned at least at one coil end in two steps.

In the stator manufacturing method described above, preferably, the bending step includes edgewise bending the portion of the conductor positioned at one coil end in one step, and the method further includes the step of tilting down an end of the twisted portion of the conductor that has undergone the twisting step and is positioned at one coil end.

With this method, the stator described above can be manufactured, wherein bends of conductors do not interfere with each other at coil ends when coils are overlapped so that the coils protrude less in the radial direction of the stator. Thus a stator with its size reduced in the radial direction can be manufactured.

In the stator manufacturing method described above, preferably, the twisting step includes twisting a plurality of the conductors having undergone the bending step, at the same time with their twisted portions aligned with each other.

Thereby, coil production efficiency can be improved as compared to twisting one conductor at a time, and also the in-slot portions of conductors can be closely overlapped with each other.

Advantageous Effects of Invention

According to the stator and method of manufacturing the same, as described above, when coils are overlapped, bends of conductors do not interfere with each other at coil ends. Therefore, the coils protrude less in the radial direction of the stator, and can be made smaller in the radial direction of the stator.

BRIEF DESCRIPTION OF DRAWINGS

FIG. 2 is a table showing a cranking amount of the conductor;

DESCRIPTION OF EMBODIMENTS

Hereinafter embodiments of the present invention will be described in detail with reference to the accompanying drawings.

Figure 1:
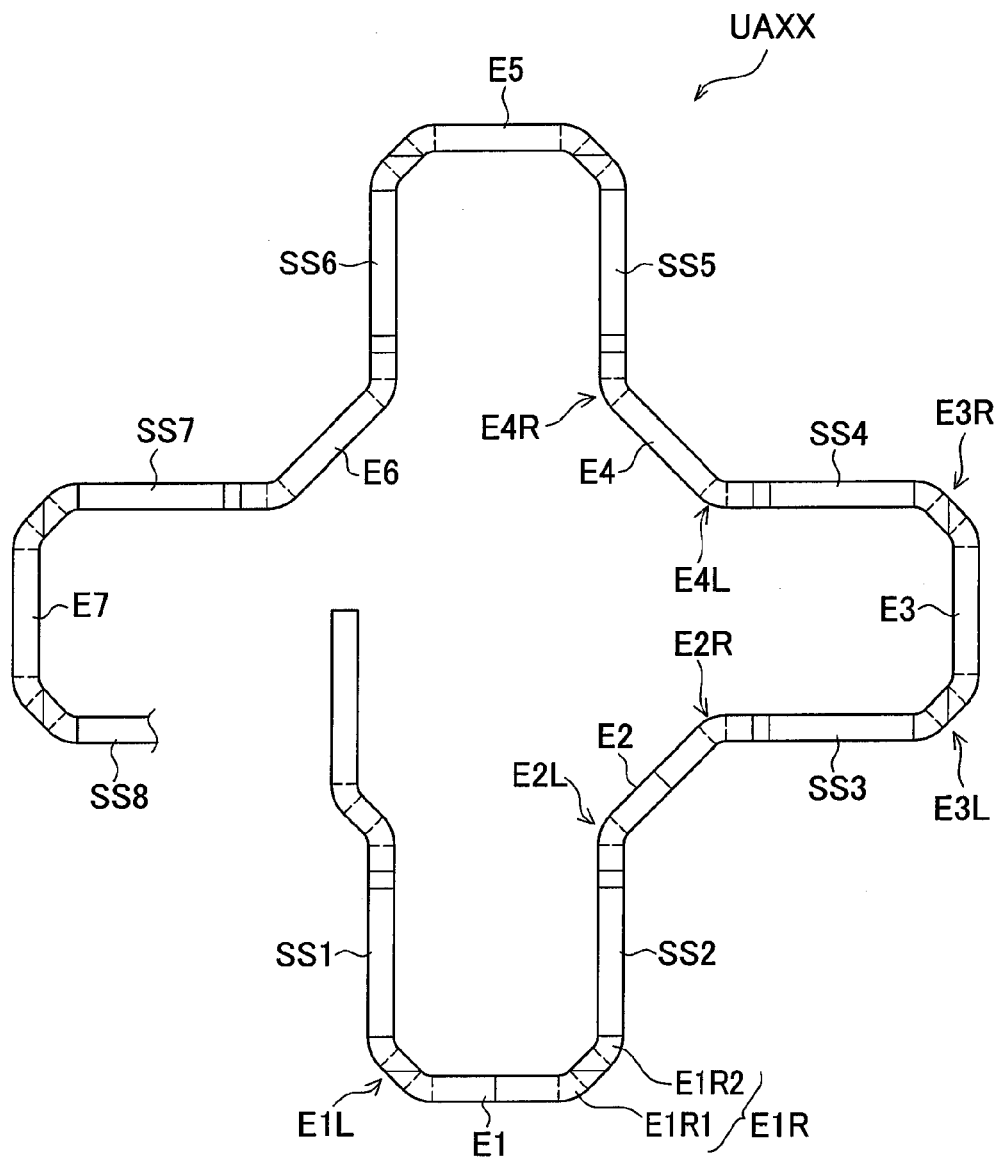
FIG. 1 is a diagram showing a shape of a conductor blank that has undergone bending and cranking processes.

FIG. 1 shows a conductor blank. The conductor blank UAXX shown in FIG. 1 will form a first U-phase conductor. The conductor blank UAXX is bent edgewise at 45° at predetermined positions to be formed into a generally cross shape, as well as cranked in a direction orthogonal to the paper plane. The conductor blank UAXX has a length substantially corresponding to one turn around the stator. The conductor blank UAXX in this embodiment has a rectangular cross section with a short side of 1 mm and a long side of 6 mm. The long side is visible in FIG. 1, with the short side being the thickness. The material is copper, and enamel-coated for providing insulation. The thickness of the enamel coat is set such as to maintain sufficient insulation even when the conductor is deformed as shown in FIG. 1. FIG. 1 shows the conductor blank UAXX that was straight and underwent the bending and cranking processes.

Linear parts of the conductor blank UAXX form in-slot target portions SS1, SS2, . . . , with circumferential portions E1, E2, . . . coupling them successively. Each circumferential portion E1, E2, . . . is cranked (offset) by a predetermined amount relative to each in-slot target portion SS1, SS2, . . . . For example, the conductor blanks UAXX and UCXX (corresponding to the first turn) according to this embodiment are cranked as shown in FIG. 2. In FIG. 2, positive numbers indicate that the conductor is cranked radially outwards of the stator, while negative numbers indicate that the conductor is cranked radially inwards of the stator. Namely, with the conductor blank UAXX shown in FIG. 1, the left part of the circumferential portions E1 and E2 is offset by 3.5 mm closer to the reader, while the right part is offset by 5.5 mm further from the reader, and the circumferential portions E3 to E7 are entirely offset by 5.5 mm further from the reader. Wire blanks UAXX and UCXX corresponding to the second turn and onwards, and respective conductor blanks forming V-phase and W-phase are also cranked by a predetermined amount.

A bent portion EL is formed on the left side of each circumferential portion E, and a bent portion ER is formed on the right side of each circumferential portion E. Namely, the bent portions EL and ER are arranged such as to connect the in-slot target portions SS and circumferential portions E. Of the bent portions EL and ER, those (E2L, E2R, . . . ) on the left and right of circumferential portions E2, E4, . . . positioned on the lead side are formed by one-step edgewise bending at 45°. Of the bent portions EL and ER, those (E1L, E1R, . . . ) on the left and right of circumferential portions E1, E3, . . . positioned on the non-lead side are formed by two-step edgewise bending at 45°.

Figure 3:
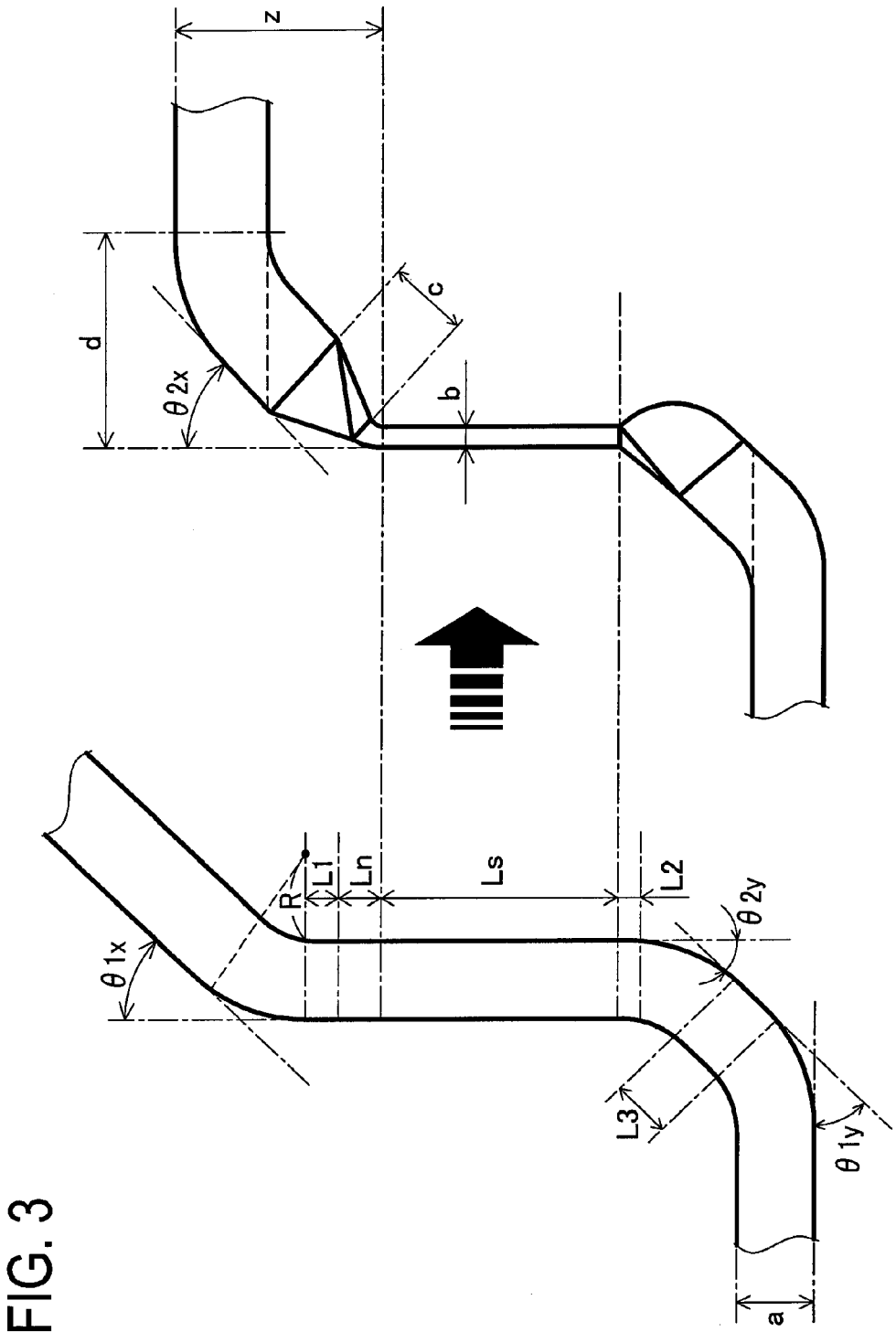
FIG. 3 is a diagram showing various parameters of a conductor after a bending process and a conductor after a twisting process used for determining a bending angle.
Figure 4:
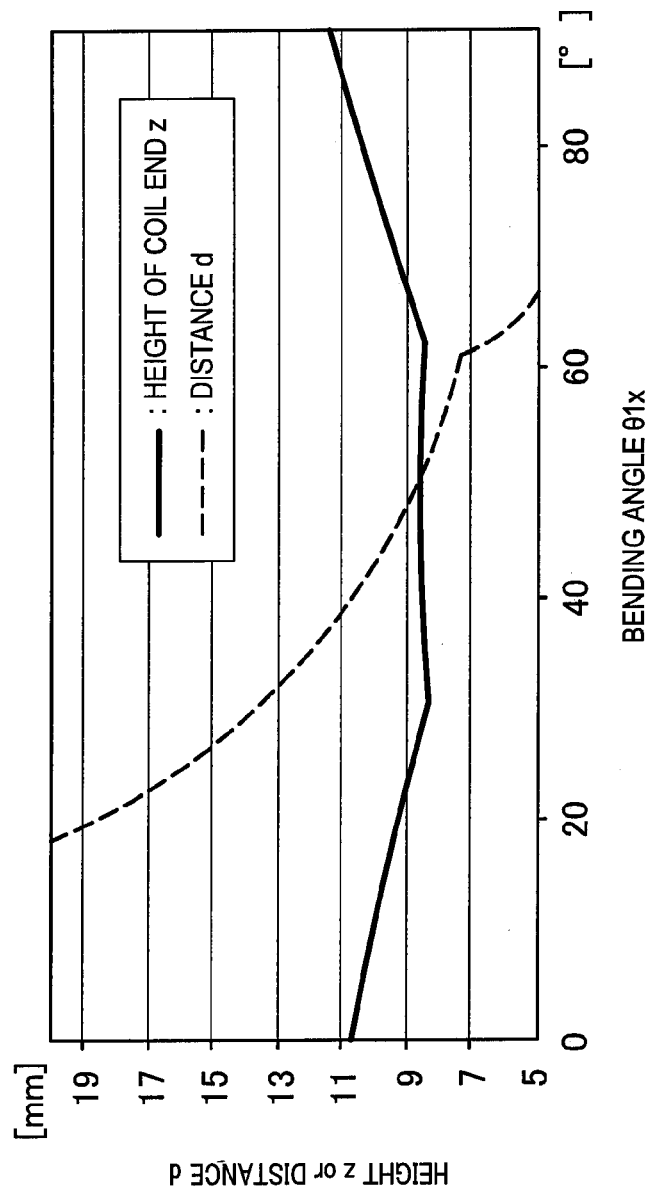
FIG. 4 is a graph showing a relationship between coil end height z and distance d relative to the bending angle.

At this point, the bending angle in regard to the bending process will be explained with reference to FIG. 3 and FIG. 4. FIG. 3 is a diagram showing various parameters of a conductor after a bending process and a conductor after a twisting process used for determining the bending angle. FIG. 4 is a graph showing the relationship between the coil end height z and distance d relative to the bending angle.

Parameters used for determining the bending angle include material parameters, design parameters, performance/design parameters, and performance parameters. The material parameters include conductor width "a" and conductor thickness "b" shown in FIG. 3. The design parameters include in-slot length Ls, twisted length Ln, interference avoidance length L1 for the lead side twisted portion, interference avoidance length L2 for the non-lead side twisted portion, linear length of bent portion L3 on the non-lead side, first bending angle $\theta 1x$ on the lead side, and first bending angle $\theta 1y$ on the non-lead side. The performance/design parameters include radius of curvature R and twisting width c shown in FIG. 3. The performance parameters include coil end height z and distance d shown in FIG. 3. The distance d is an index for determining whether or not twisted portions formed at ends of in-slot portions located in adjacent slots interfere with each other. The distance d being smaller than the distance between adjacent slots means there will be no interference between the twisted portions.

The conductor width a and conductor thickness b are dependent on the conductor being used. In this embodiment, a=6 mm and b=1 mm.

The in-slot length Ls is dependent on stator lamination thickness. In this embodiment, Ls=50 mm. The twisted length Ln is given by Equation 1:

[Equation 1]

$$Ln = \sqrt{c^2 + h_1^2} \tag{1}$$

where c is the twisted width and h1 is the crank amount on the lead side.

The twisted length Ln is given by Equation 2:

[Equation 2]

$$L_1 = \frac{a\cos\theta 1x - R(1 - \cos\theta 1x)}{\sin\theta 1x} \tag{2}$$

where a is the conductor width, $\theta 1x$ is the first bending angle on the lead side, and R is the radius of curvature.

The interference avoidance length L2 for the non-lead side twisted portion is given by Equation 3:

[Equation 3]

$$L_2 = \sqrt{(R + L_3\cos\theta 2y)^2 h_2^2} - (R + L_3 \cos\theta 2y) \tag{3}$$

where R is the radius of curvature, L3 is the linear length of bent portion on the non-lead side, $\theta 2y$ is the second bending angle on the non-lead side, and h2 is the crank height on the non-lead side.

The linear length of bent portion L3 on the non-lead side, radius of curvature R, and twisting width c may be set as small as possible respectively within the range satisfying necessary insulation performance requirements. In this embodiment, L3=12 mm, R=5 mm, and c=6 mm.

The coil end height z is given by Equation 4:

[Equation 4]

$$z = \sqrt{\left(\frac{a}{2} - \frac{b}{2}\right)^2 + c^2} \, |\sin(\theta 1x - 30)| + \max(a\cos\theta 1x, R(1 - \cos\theta 1x)) + a \tag{4}$$

where a is the conductor width, b is the conductor thickness, c is the twisting width, $\theta 1x$ is the first bending angle on the lead side, and R is the radius of curvature.

The distance d is given by Equation 5-1 if the interference avoidance length L1 for the lead side twisted portion is larger than 0 (L1>0), whereas it is given by Equation 5-2 if L1=0:

[Equation 5-1]

$$d = \sqrt[2]{\left(\frac{a}{2} - \frac{b}{2}\right)^2 + c^2} \sin\left(90 - \theta 1x - \arcsin\left(\frac{a-b}{(a-b)^2 + 4c^2}\right)\right) + \\ a\sin\theta 1x + L_1\cos\theta 1x + R\sin\theta 1x \tag{5-1}$$

where a is the conductor width, b is the conductor thickness, c is the twisting width, $\theta1x$ is the first bending angle on the lead side, L1 is the interference avoidance length for the lead side twisted portion, and R is the radius of curvature.

[Equation 5-2]

$$d = 2\sqrt{\left(\frac{a}{2} - \frac{b}{2}\right)^2 + c^2 \sin\left(90 - \theta1x - \arcsin\left(\frac{a-b}{(a-b)^2 + 4c^2}\right)\right)} + \\ a\sin\theta1x + R\sin\theta1x - \sqrt{R^2 - (a+R)^2 \cos^2\theta1x} \quad (5\text{-}2)$$

where a is the conductor width, b is the conductor thickness, c is the twisting width, $\theta1x$ is the first bending angle on the lead side, and R is the radius of curvature.

The distance d needs to be set so that the twisted portions of adjacent slots do not interfere with each other, by adjusting the first bending angle $\theta1x$ on the lead side from Equations 5-1 and 5-2. As is clear from FIG. 4, the distance d increases as the first bending angle $\theta1x$ decreases, increasing the possibility of interference between twisted portions formed at ends of in-slot portions located in adjacent slots. It can be seen that the coil end height z is low when the first bending angle $\theta1x$ is 30°≤$\theta1x$≤60°. Therefore, the first bending angle $\theta1x$ on the lead side is preferably 30°≤$\theta1x$≤60°. This will prevent interference between twisted portions tilted down between adjacent slots, make the lane portion in one layer, and reduce the coil end height. Thereby, the coils can be reduced in radial and height directions at coil ends.

In this embodiment, the first bending angle $\theta1x$ on the lead side is set $\theta1x$=45° so as to form shape easily in consideration of production efficiency and to reduce the coil end height. For the same reasons, the first bending angle $\theta1y$ on the non-lead side is also set $\theta1y$=45°. Since the first bending angle $\theta1$ and second bending angle $\theta2$ satisfy the relationship of $\theta1+\theta2$=90°, the second bending angle $\theta2x$ on the lead side is $\theta2x$=90°−$\theta1x$=45°, and the second bending angle $\theta2y$ on the non-lead side is $\theta2y$=90°−$\theta1y$=45°.

Figure 5:
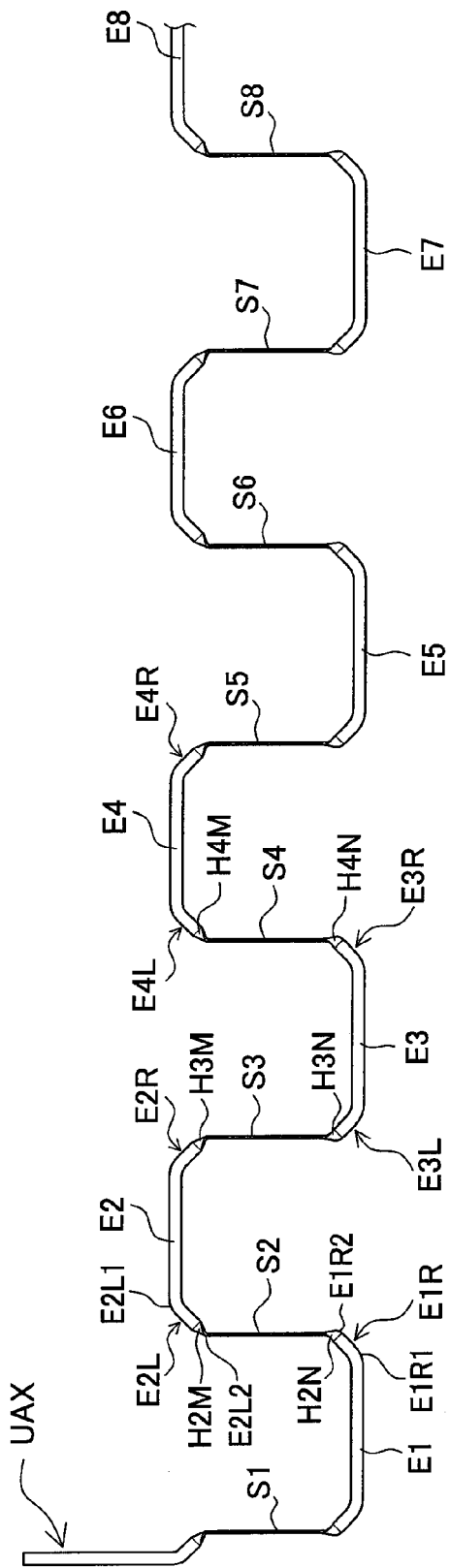
FIG. 5 is a diagram showing a part (first turn) of a conductor UAX which is a constituent element of a first U-phase conductor.

FIG. 5 shows a conductor UAX which is a constituent element of the first U-phase conductor according to the present invention. FIG. 5 shows a conductor UAX that has undergone all the bending (including the tilting) and twisting processes. The in-slot target portions SS of FIG. 1 are twisted at twisting target portions HHM and HHN in the same direction to form upper end twisted portions HM and lower end twisted portions HN in FIG. 5. In FIG. 5, the in-slot portion S2 is formed by twisting the in-slot target portion SS2 clockwise when viewed from above. The in-slot portion S3 is formed by twisting the in-slot target portion SS3 counterclockwise when viewed from above. Namely, when viewed from the circumferential portion E2, the left-end bend E2L and right-end bend E2R are twisted in opposite directions.

Such twisting can be performed easily by holding the in-slot target portion SS with chucking claws and turning the chucking claws while other parts are kept fixed. Thus the short sides of the in-slot portions S1, S2, . . . are visible in FIG. 5 while their long sides are oriented along the thickness direction.

The thickness of the enamel coat is set such that sufficient insulation can be maintained even though the conductor is twisted as shown in FIG. 5.

The bent portions EL and ER for connecting the in-slot target portions SS and circumferential portions E include two bends, i.e., first bend EL1 and second bend EL2, and first bend ER1 and second bend ER2 (see also FIG. 1). The first bends EL1 and ER1 are provided on the side of the circumferential portion E, while the second bends EL2 and ER2 are provided on the side of the in-slot target portion SS.

More specifically, the bent portions EL and ER positioned on the lead side (upper side in the drawing) include first bends EL1 and ER1 formed by bending before the twisting process, and second bends EL2 and ER2 formed by tilting after the twisting process. On the other hand, the bent portions EL and ER positioned on the non-lead side (lower side in the drawing) include first bends EU and ER1 and second bends EL2 and ER2 formed by bending before the twisting process. For example, the bent portion E2L on the lead side includes a first bend E2L1 and a second bend E2L2, and the bent portion E1R on the non-lead side includes a first bend E1R1 and a second bend E1R2.

Now, the process steps of forming the conductor UAX shown in FIG. 5 from the conductor blank UAXX shown in FIG. 1 will be described with reference to FIG. 6 to FIG. 10. In this embodiment, conductors UAX and UCX are formed from the conductor blank UAXX that is a constituent element of the first U-phase conductor and the conductor UCXX that is a constituent element of a third U-phase conductor.

Figure 6:
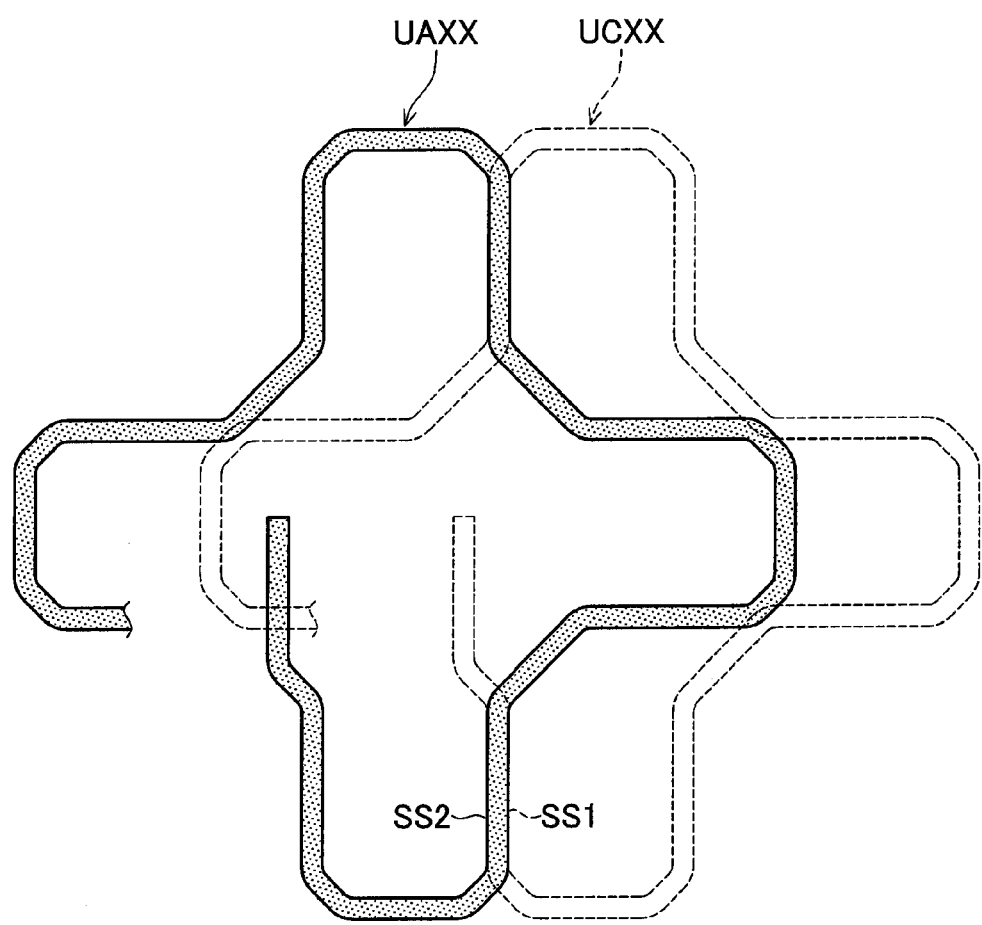
FIG. 6 is a diagram showing two conductor blanks overlapped with their twisted portions aligned with each other.

First, as shown in FIG. 6, the conductor blanks UAXX and UCXX that have been bent and cranked into the shape shown in FIG. 1 are overlapped, with their twisted portions aligned with each other. More specifically, the in-slot target portion SS2 of the conductor blank UAXX is overlapped with the in-slot target portion SS1 of the conductor blank UCXX. The overlapped in-slot target portions SS are held with chucking claws, and twisted by turning the chucking claws while other parts are kept fixed. At this time, the in-slot target portion SS2 of the conductor blank UAXX and the in-slot target portion SS1 of the conductor blank UCXX are twisted clockwise when viewed from above in FIG. 6. The in-slot target portions SS2 and SS1 overlapped and twisted thus form the in-slot portions S2 and S1 so that their short sides are visible in FIG. 7 while their long sides are oriented along the thickness direction.

Figure 7:
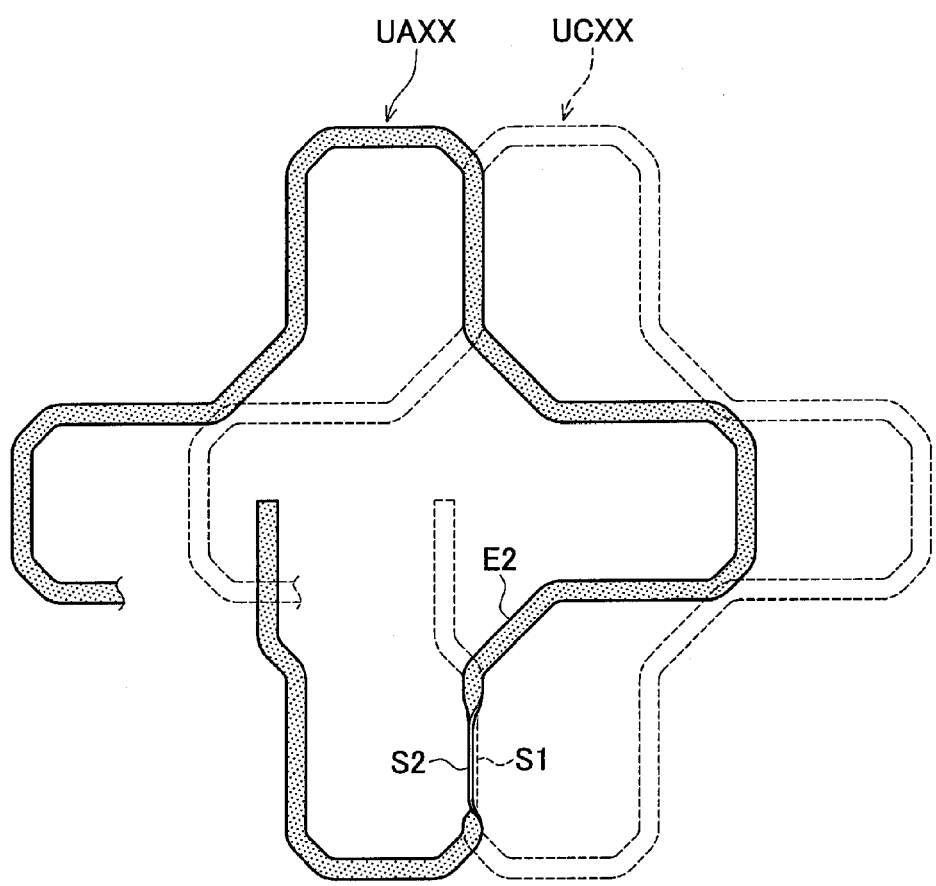
FIG. 7 is a diagram showing the two conductor blanks having undergone the twisting process at the same time.
Figure 8:
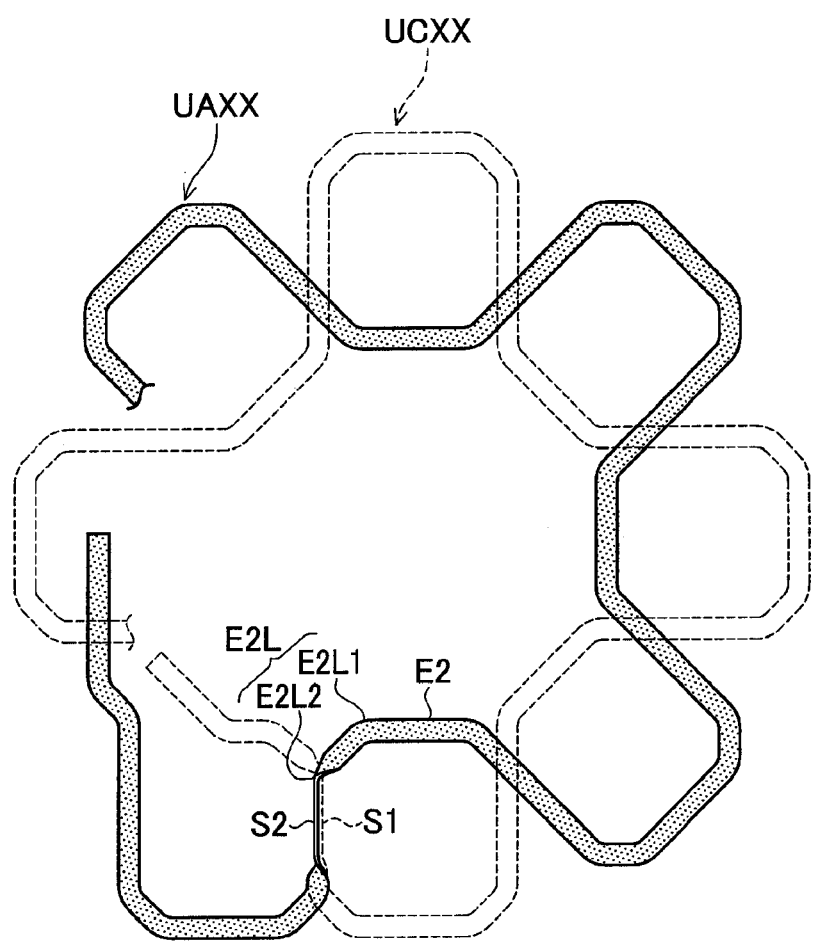
FIG. 8 is a diagram showing the conductor blanks having undergone a tilting process.

Next, upper ends of the in-slot portions S2 and S1 are tilted downwards in FIG. 7. More specifically, the conductor blanks UAXX and UCXX are bent at 45° respectively at the upper ends of the in-slot portions S2 and S1. Thereby, the second bend E2L2 on the lead side is formed. The conductor blanks UAXX and UCXX thus take on the shape shown in FIG. 8, in which the bent portion E2L is formed on the left side of the circumferential portion E2.

Figure 9:
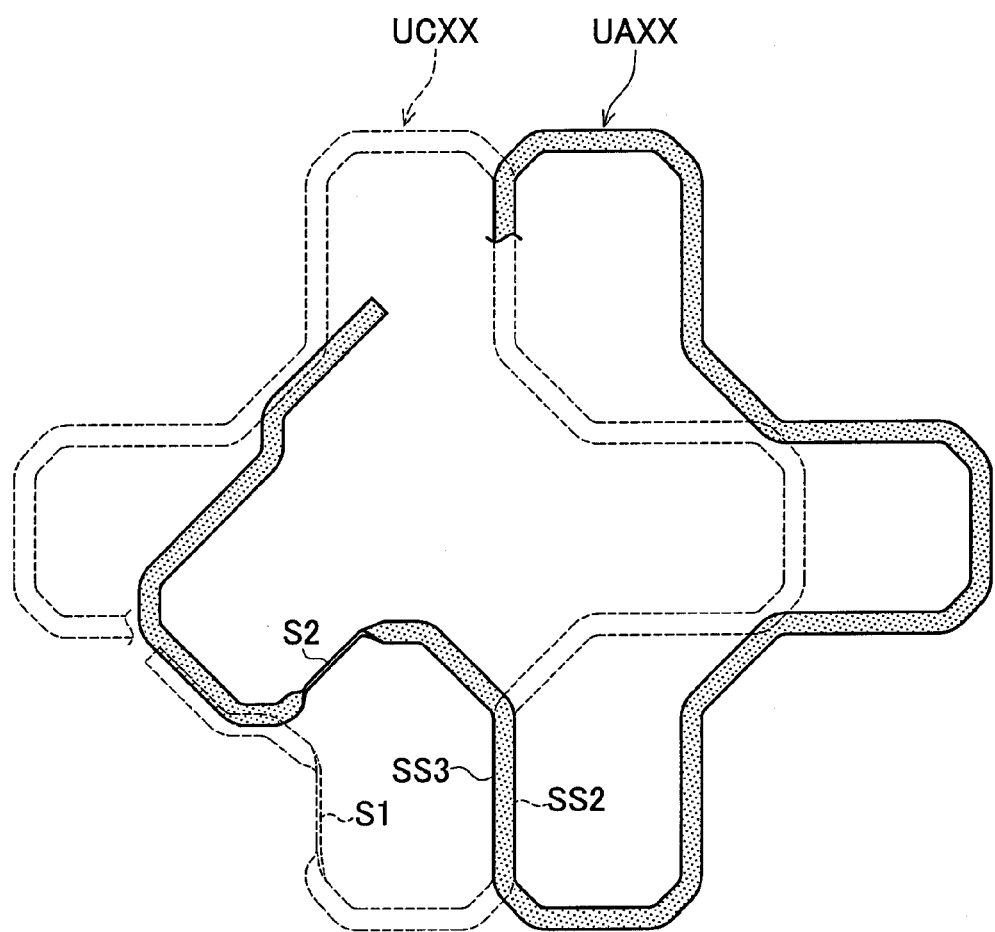
FIG. 9 is a diagram showing the two conductor blanks with their twisted portions aligned with each other.
Figure 10:
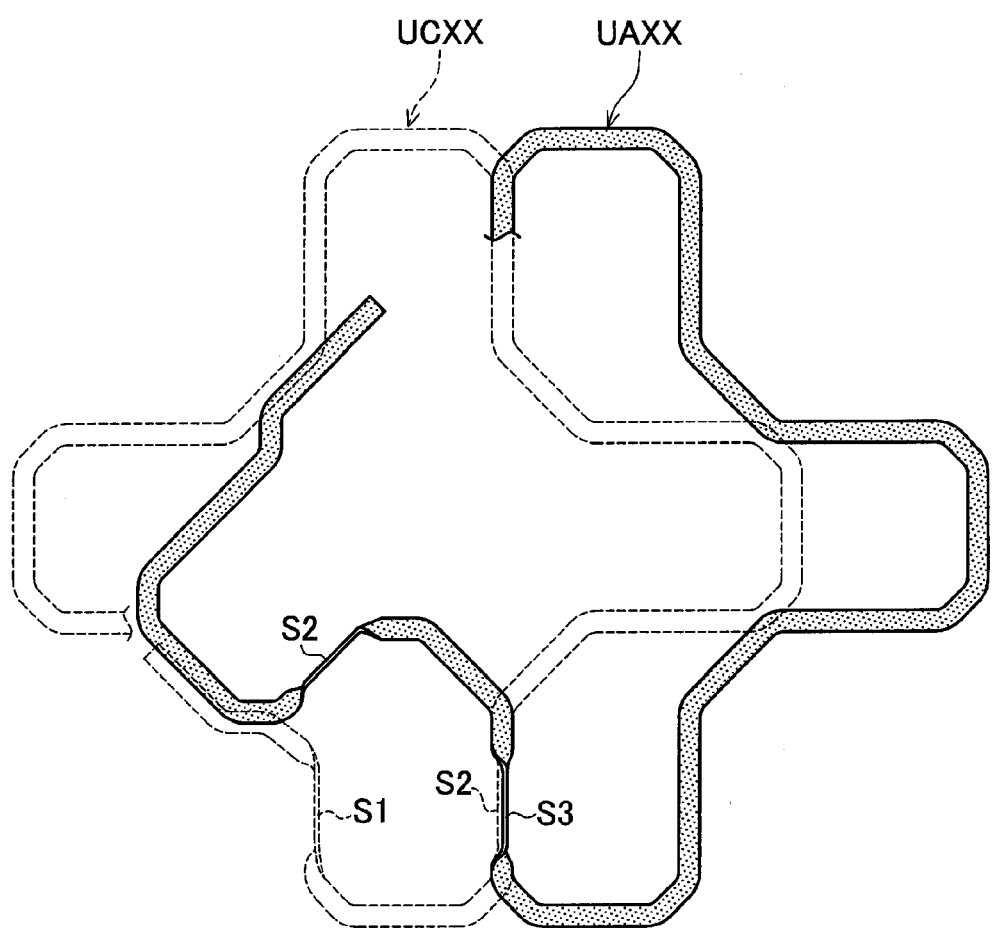
FIG. 10 is a diagram showing the two conductor blanks having undergone the twisting process at the same time.

Next, as shown in FIG. 9, an in-slot target portion SS3 of the conductor blank UAXX and an in-slot target portion SS2 of the conductor blank UCXX are overlapped with each other. The overlapped in-slot target portions SS3 and SS2 are held with chucking claws, and twisted by turning the chucking claws while other parts are kept fixed. At this time, the in-slot target portion SS3 of the conductor blank UAXX and the in-slot target portion SS2 of the conductor blank UCXX are twisted counterclockwise when viewed from above in FIG. 9. The in-slot target portions SS3 and SS2 overlapped and twisted thus form the in-slot portions S3 and S2 so that their short sides are visible in FIG. 10 while their long sides are oriented along the thickness direction.

After that, overlapping of the in-slot target portions, twisting, and tilting (bending at 45°) are repeatedly performed. The twisting is done alternately in opposite directions, i.e., clockwise, counterclockwise, clockwise, etc. As a result, the conductor UAX shown in FIG. 5 and the conductor UCX are obtained.

Figure 11:
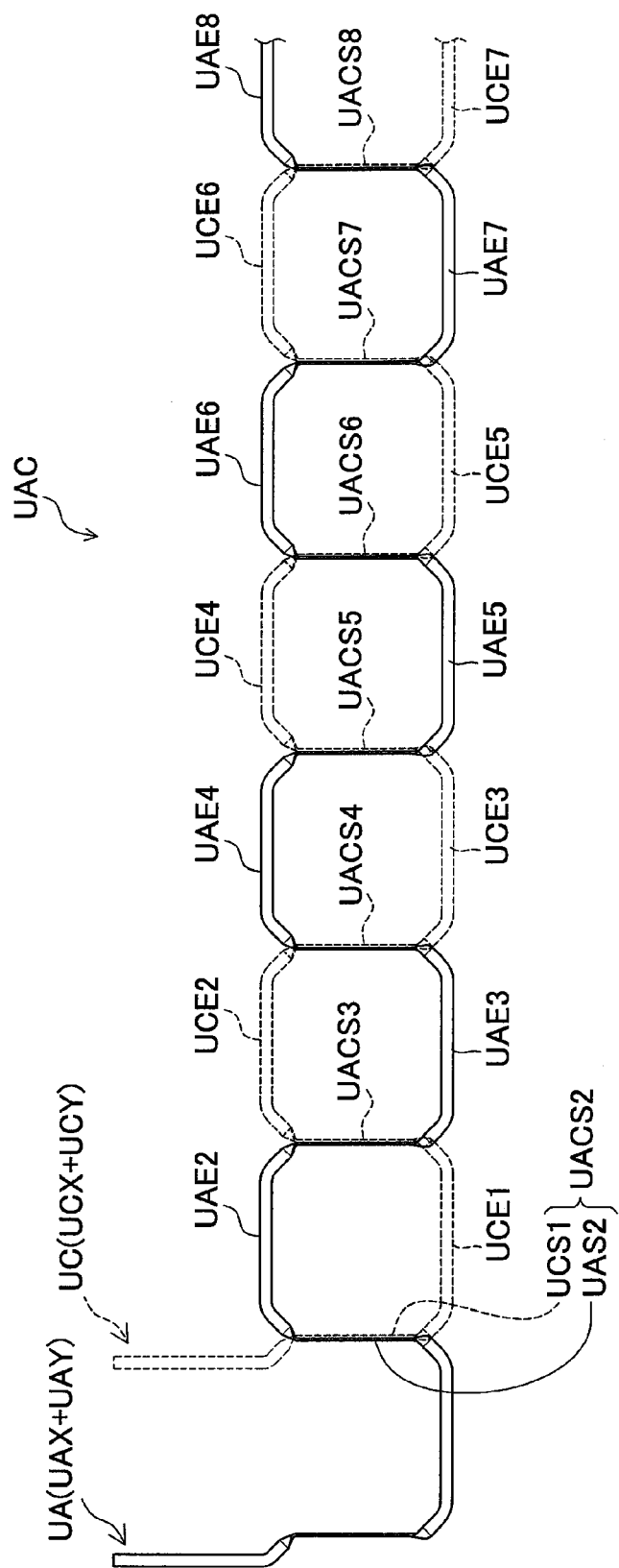
FIG. 11 is a diagram showing a part of a first U-phase conductor assembly UAC.

The first U-phase conductor UA is made up of three each (three turns) of the conductors UAX and UAY formed as described above, closely overlapped with each other and welded together at their ends. Unlike the conductor for the first turn shown in FIG. 5, the starting end (left end) of the conductors for the second and third turns is bent to be horizontal so that they can be connected to the terminal end (right end) of the conductor for the first turn. Welded portions are covered by an insulating tape or the like for providing insulation. The second turn of conductor is longer than the first turn, and the third turn is longer than the second turn. The third conductor UC is offset by one pitch to have a different phase from that of the first conductor UA and similarly made up of three each (three turns) of the conductors UCX and UCY closely overlapped with each other and welded together at their ends. The third conductor UC is overlapped on the first conductor UA so as to form a first U-phase conductor assembly UAC as shown in FIG. 11. One pitch corresponds to a half length of one cycle of the first conductor UA and third conductor UC.

The first conductor UA and third conductor UC overlapped and offset by one pitch form a rectangular coil as shown in FIG. 11. The in-slot portion UACS2 includes the in-slot portion UAS2 (UAS2X+UAS2Y) of the first conductor UA, extending from below upwards in the drawing, and the in-slot portion UCS1 (UCS1X+UCS1Y) of the third conductor UC, extending from above downwards in the drawing, overlapping with each other, with the in-slot portion UCS1 positioned on top. Namely, four conductors UAS2X, UAS2Y, UCS1X, and UCS1Y are overlapped with each other in the short side direction.

Figure 12:
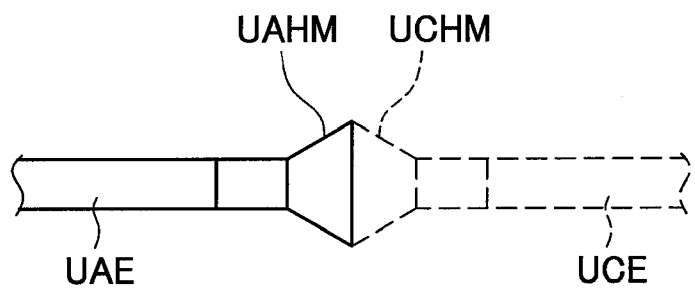
FIG. 12 is a diagram schematically showing the vicinity of a portion inserted in a slot of the first U-phase conductor assembly UAC shown in FIG. 11, viewed from a lead side (upper side)

In this rectangular coil formed by the first conductor UA and third conductor UC, the bent portions EL and ER on the lead side include the first bends EL1 and ER1 formed by bending and second bends EL2 and ER2 formed by tilting. Therefore, as shown in FIG. 12, the circumferential portions UAE and UCE do not interfere with each other at coil ends so that the lane portion is made in one layer. FIG. 12 is a diagram, viewed from the lead side (upper side), of the vicinity of a portion inserted in the slot of the first U-phase conductor assembly UAC shown in FIG. 11. The second bends EL2 and ER2 can be formed by tilting on the lead side in this way because the bent portions EL and ER extending out from the same slot to the coil end do not cross each other. Tilting does not exert any excessive force to and near the twisted portions, so that the enamel coat on the conductor will not be damaged.

On the other hand, on the non-lead side, the bent portions EL and ER include the first bends EU and second bends EL2 formed by bending. Therefore, the circumferential portions UAE and UCE do not interfere with each other at coil ends so that the lane portion is made in one layer. On the non-lead side, the conductor is bent edgewise in two steps as described above because the bent portions EL and ER extending out from the same slot to the coil end cross each other on the non-lead side and the second bend ER2 cannot be formed by tilting as on the lead side.

In this way, any unnecessary space is eliminated at coil ends both on the lead side and non-lead side. Therefore, the coils protrude less in the radial direction of the stator (toward the back yolk), and can be made smaller in the radial direction of the stator.

Figure 13:
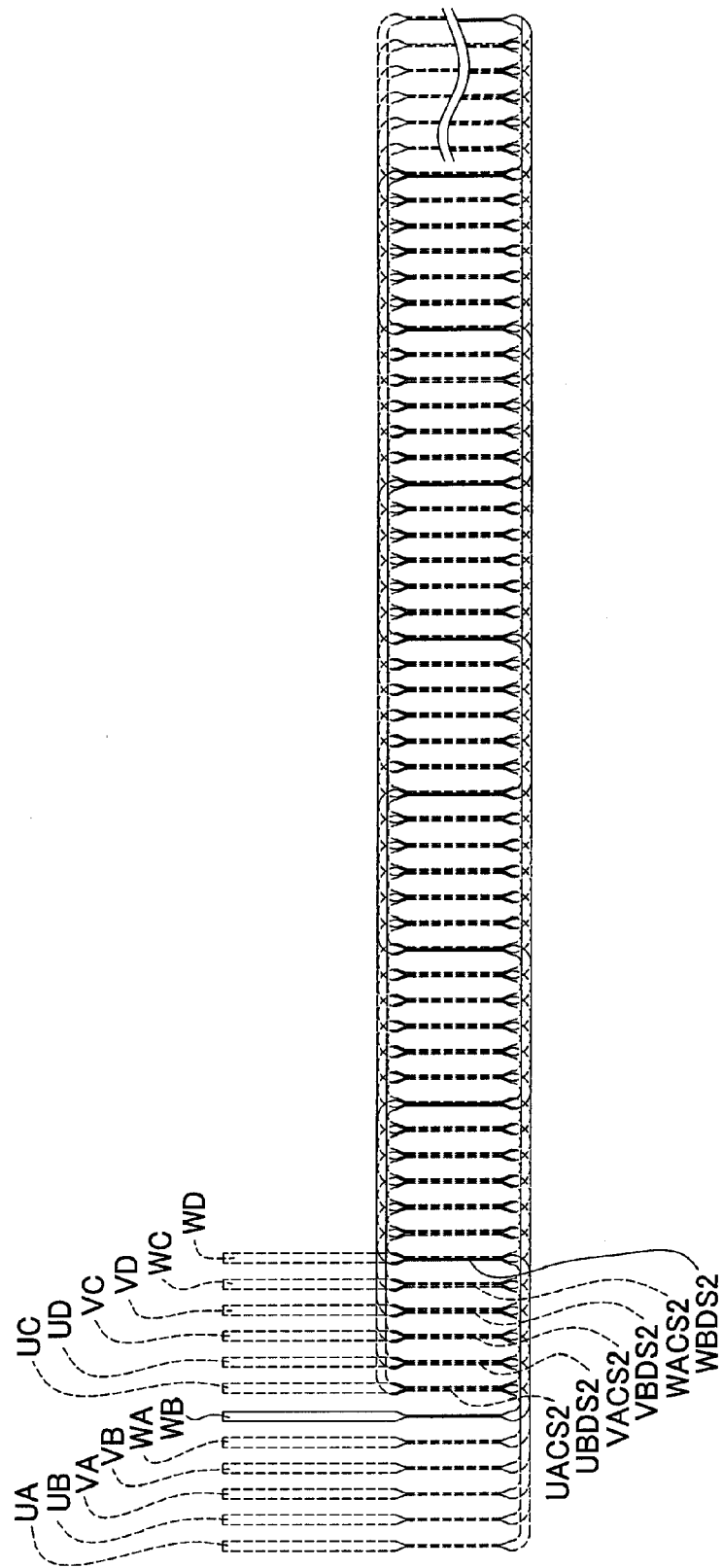
FIG. 13 is a diagram showing conductors UA, UB, VA, VB, WA, WB, UC, UD, VC, VD, WC, and WD arranged from left and overlapped one after another.

FIG. 13 shows conductor UB (second U-phase conductor), conductor VA (first V-phase conductor), conductor VB (second V-phase conductor), conductor WA (first W-phase conductor), and conductor WB (second W-phase conductor), and further, conductor UC (third U-phase conductor), conductor UD (fourth U-phase conductor), conductor VC (third V-phase conductor), conductor VD (fourth V-phase conductor), conductor WC (third W-phase conductor), and conductor WD (fourth W-phase conductor), overlapped one after another upon the conductor UA (first U-phase conductor) with an offset corresponding to one slot between successive conductors. Namely, the conductors UA, UB, VA, VB, WA, WB, UC, UD, VC, VD, WC, and WD arranged in this order from the left are stacked upon one another with an offset of one slot. In this regard, the conductor UA is positioned at the bottom, while the conductor WD is positioned at the top.

Figure 14:
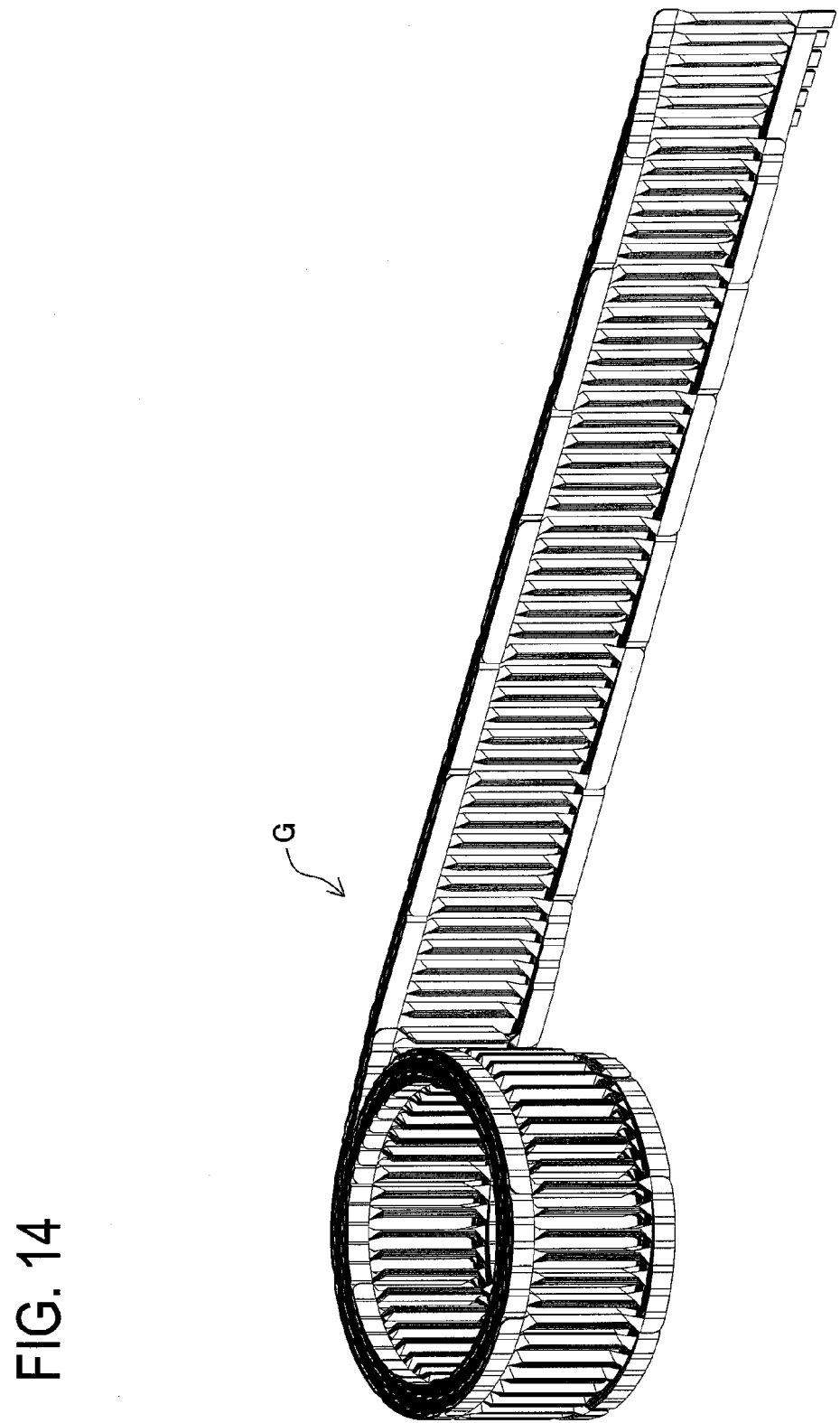
FIG. 14 is a perspective view of the twelve conductors shown in FIG. 13, in the course of winding.
Figure 15:
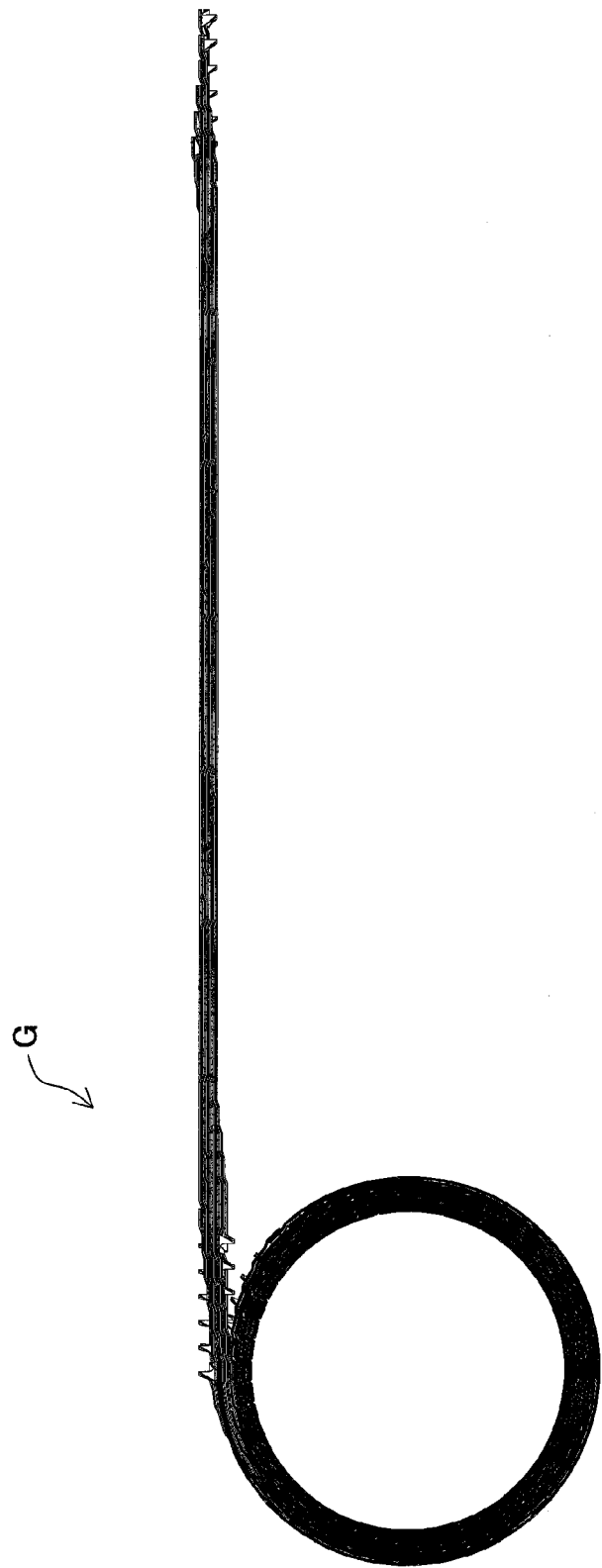
FIG. 15 is a plan view of FIG. 14.

FIG. 14 shows a perspective view of the twelve conductors UA, UB, VA, VB, WA, WB, UC, UD, VC, VD, WC, and WD shown in FIG. 13 overlapped and taken up. FIG. 15 shows a plan view of FIG. 14. Since the stator of this embodiment includes forty eight slots on the inner circumference, the first U-phase conductor assembly UAC shown in FIG. 11 includes eight in-slot portions UACS1 to UACS8 in the first turn. Similarly, a second U-phase conductor assembly UBD includes eight in-slot portions UBDS1 to UBDS8 in the first turn. Similarly, a first V-phase conductor assembly VAC includes eight in-slot portions VACS1 to VACS8 in the first turn. Similarly, a second V-phase conductor assembly VBD includes eight in-slot portions VBDS1 to VBDS8 in the first turn. Similarly, a first W-phase conductor assembly WAC includes eight in-slot portions WACS1 to WACS8 in the first turn. Similarly, a second W-phase conductor assembly WBD includes eight in-slot portions WBDS1 to WBDS8 in the first turn.

Six conductor assemblies UAC, UBD, VAC, VBD, WAC, and WBD each include eight in-slot portions S in the first turn, so that there are forty eight in-slot portions S formed in the first turn. These forty eight in-slot portions S are positioned with an offset of one slot therebetween.

As shown in FIG. 14 and FIG. 15, the three-phase coil G according to this embodiment is completed by taking up three turns of the six conductor assemblies. Therefore, in-slot portions in the second turn (for example, UACS10) are overlapped from outside on the in-slot portions S in the first turn (for example, UACS2), and in-slot portions in the third turn (for example, UACS18) are further overlapped from outside thereon. That is, the in-slot portions are stacked in three layers. FIG. 14 and FIG. 15 show a state at the time when the second turn has been taken up and the third turn is beginning to be taken up.

Similarly, in the three-phase coil G, the circumferential portions E are overlapped in the radial direction of the stator. In the proposed technique mentioned above, bends of conductors interfere with each other at coil ends, because of which the coils protrude in the radial direction of the stator due to unnecessary space taken up at the coil ends, resulting in an increase in the coil size in the radial direction of the stator.

In contrast, in the three-phase coil G according to this embodiment, since bends of conductors do not interfere with each other at coil ends and there is no unnecessary space at coil ends, the coils protrude less in the radial direction of the stator. In this manner, the three-phase coil G is smaller in the radial direction of the stator.

The basic configuration of the three-phase coil G is the same as the coil cage in the proposed technique, the detail of which is described in Japanese Patent Application No. 2009-016549, and therefore the three-phase coil G will not be described in detail here.

Figure 16:
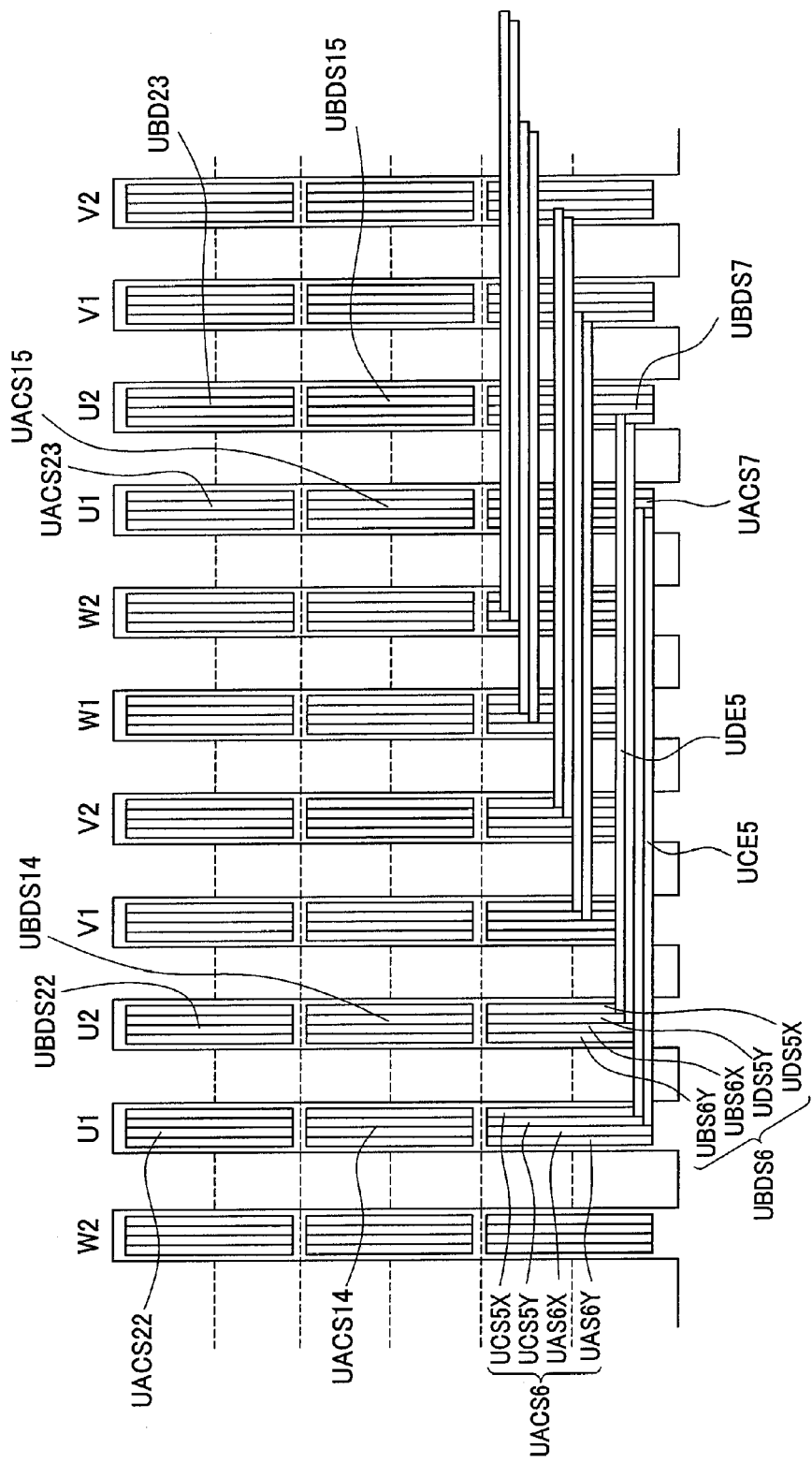
FIG. 16 is a conceptual diagram of arrangement of in-slot portions in a stator.

FIG. 16 shows a conceptual diagram of the arrangement of the in-slot portions in the stator. For ease of illustration, slots that are ordinarily arranged circumferentially are shown in a linear arrangement.

The in-slot portions of various phases are arranged successively as follows: U1-phase consisting of the first U-phase conductor assembly UAC (conductors UA and UC), U2-phase consisting of the second U-phase conductor assembly UBD (conductors UB and UD), V1-phase consisting of the first V-phase conductor assembly VAC (conductors VA and VC), V2-phase consisting of the second V-phase conductor assembly VBD (conductors VB and VD), W1-phase consisting of the first W-phase conductor assembly WAC (conductors WA and WC), and W2-phase consisting of the second W-phase conductor assembly WBD (conductors WB and WD).

In each in-slot portion S, four in-slot portions S are arranged in close contact in the first turn. For example, the in-slot portion UACS6 arranged in the first turn of U1-phase includes four portions UAS6Y, UAS6X, UCS5Y, and UCS5X from the left side as shown in FIG. 16, successively and closely overlapping in the circumferential direction such that their long sides are aligned in the diametrical direction. The in-slot portion UCS5 (UCS5X+UCS5Y) is connected to UACS7 disposed in the next U1-phase slot by way of the circumferential portion UCE5 depicted thereabove, as shown in FIG. 16.

The in-slot portion UAS6 (UAS6X+UAS6Y) is connected to UACS7 disposed in the next U1-phase slot by way of the circumferential portion UAE6 that is hidden underneath.

Similarly, the in-slot portion UBDS6 includes four in-slot portions UBS6Y, UBS6X, UDS5Y, and UDS5X from the left side, successively and closely overlapping in the circumferential direction such that their long sides are aligned in the diametrical direction.

The in-slot portion UDS5 (UDS5X+UDS5Y) is connected to UBDS7 disposed in the next U1-phase slot by way of the circumferential portion UDE5 depicted thereabove, as shown in FIG. 16.

The in-slot portion UBS6 (UBS6X+UBS6Y) is connected to UBDS7 disposed in the next U1-phase slot by way of the circumferential portion UBE6 that is hidden underneath.

Figure 17:
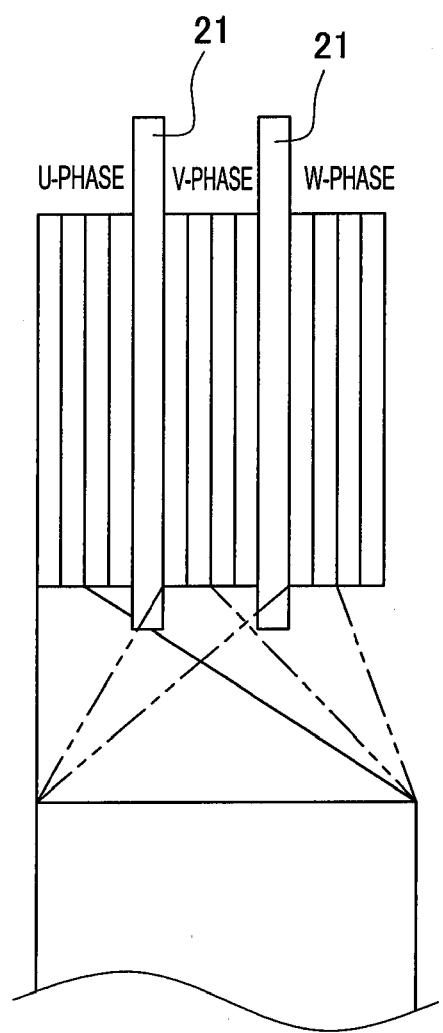
FIG. 17 is a sectional view of the vicinity of a circumferential portion.

FIG. 17 shows a sectional view of the vicinity of a circumferential portion. As shown in FIG. 17, U1-phase and U2-phase are overlapped in the diametrical direction, then V1-phase and V2-phase are overlapped in the radial direction, and then W1-phase and W2-phase are overlapped in the radial direction. Therefore, the number of points where the interlayer insulating paper 21 is mounted can be reduced.

Although a detailed description of the shape of V1-phase, V2-phase, W1-phase, and W2-phase conductors will be omitted, twisted portions of the V1-phase, V2-phase, W1-phase, and W2-phase are adjusted such that they do not interfere with each other and that they can be easily inserted.

The three-phase coil G is complete when the third turn is taken up as shown in FIG. 14. The in-slot portion UACS14 is positioned on the outside of the in-slot portion UACS6 of the first turn of U1-phase, and further on the outside thereof is positioned the in-slot portion UACS22. The in-slot portion UACS15 is positioned on the outside of the in-slot portion UACS7 of the first turn of U1-phase, and further on the outside thereof is positioned the in-slot portion UACS23.

The in-slot portion UBDS14 is positioned on the outside of the in-slot portion UBDS6 of the first turn of U2-phase, and further on the outside thereof is positioned the in-slot portion UBDS22. The in-slot portion UBDS15 is positioned on the outside of the in-slot portion UBDS7 of the first turn of U2-phase, and further on the outside thereof is positioned the in-slot portion UBDS23.

Figure 18:
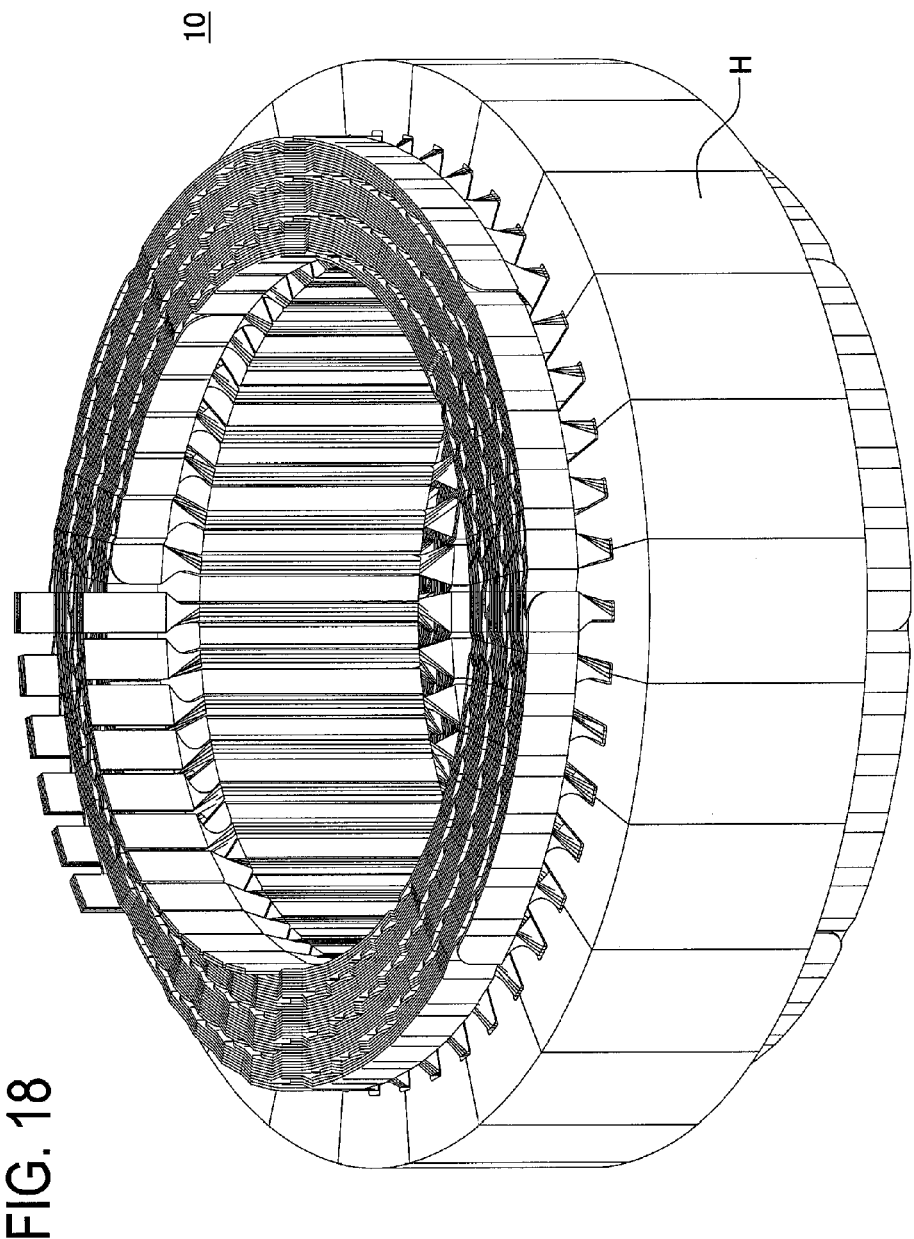
FIG. 18 is a perspective view of the stator in the embodiment.

By taking up the conductors shown in FIG. 14 completely, the three-phase coil G is finished. Then, separate split core members H are mounted from outer circumference of the three-phase coil G to the space between adjacent slot portions and fixed. An external connection terminal is fixedly attached. Thus the stator 10 shown in FIG. 18 is complete.

As described above in detail, in the stator 10 according to this embodiment, the bent portions EL and ER positioned at the coil ends of the three-phase coil G include first bends EL1 and ER1 formed on the side of the circumferential portion E and second bends EL2 and ER2 formed on the side of the in-slot portion S, so that when the coils are overlapped with each other, bends of the conductors do not interfere with each other at coil ends so that the lane portion can be made in one layer. Thereby the coils are made to protrude less in the radial direction of the stator (toward the back yolk), and can be made smaller in the radial direction of the stator.

Plural in-slot portions S can be overlapped in the circumferential direction inside the slots such that their cross-sectional long sides are oriented in the radial direction of the stator 10, which enables in-slot portions S of different phases to be arranged at positions where they do not interfere with each other, meaning that the conductors can be bridged across slots in a shortest path. This, combined with the fact that plural circumferential portions E are arranged at coil ends such that their cross-sectional short sides overlap in the circumferential direction of the stator 10, minimizes space taken up at coil ends, and therefore the coil ends can be made small.

Also, since the coils need not be interwoven at coil ends, the production efficiency can be increased.

Figure 19:
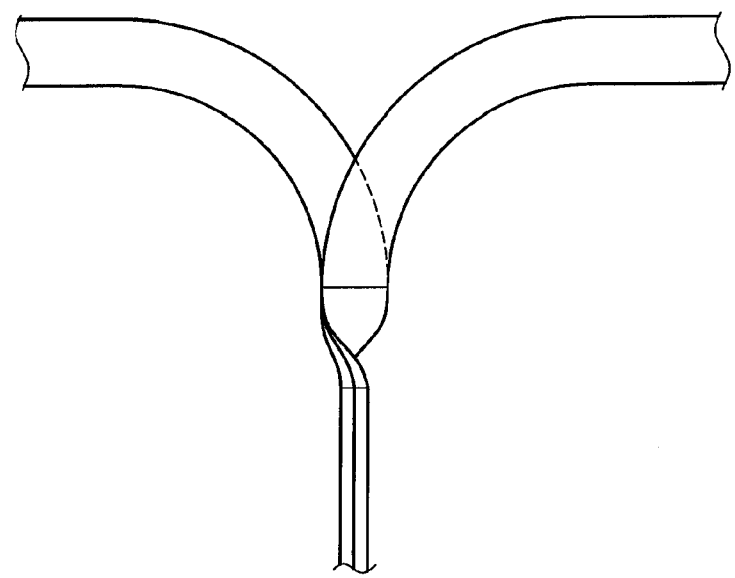
FIG. 19 is a diagram showing a modified example for making a lane portion of a coil end in one layer.

The embodiment described above is given by way of illustration only and not intended to limit the present invention in any way. It should be understood that various improvements and variations are possible without departing from the subject matter of the invention. For example, in the embodiment described above, the bent portions EL and ER include two bends EL1, ER1, EL2, and ER2, so that the lane portion at coil ends is made in one layer. Instead of providing two bends in the bent portion, the radius of curvature R may be increased as shown in FIG. 19 so as to make the lane portion in one layer. In this case, however, the coil end height z and distance d will be increased.

Figure 20:
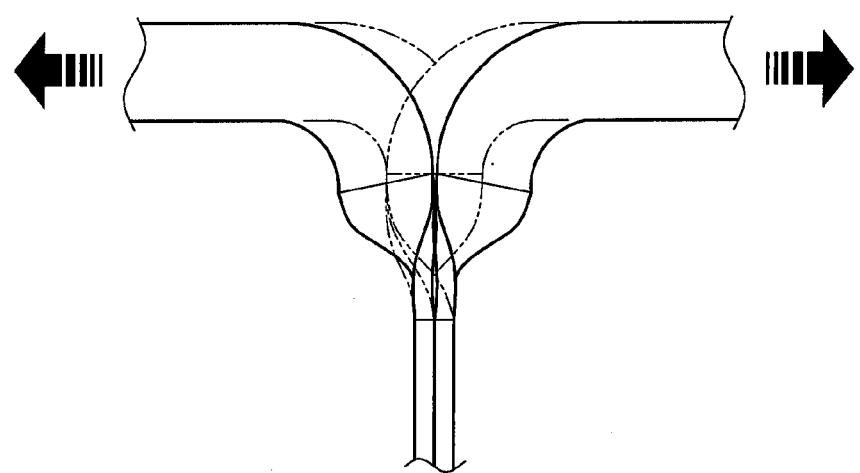
FIG. 20 is a diagram showing another modified example for making a lane portion of a coil end in one layer.
Figure 21:
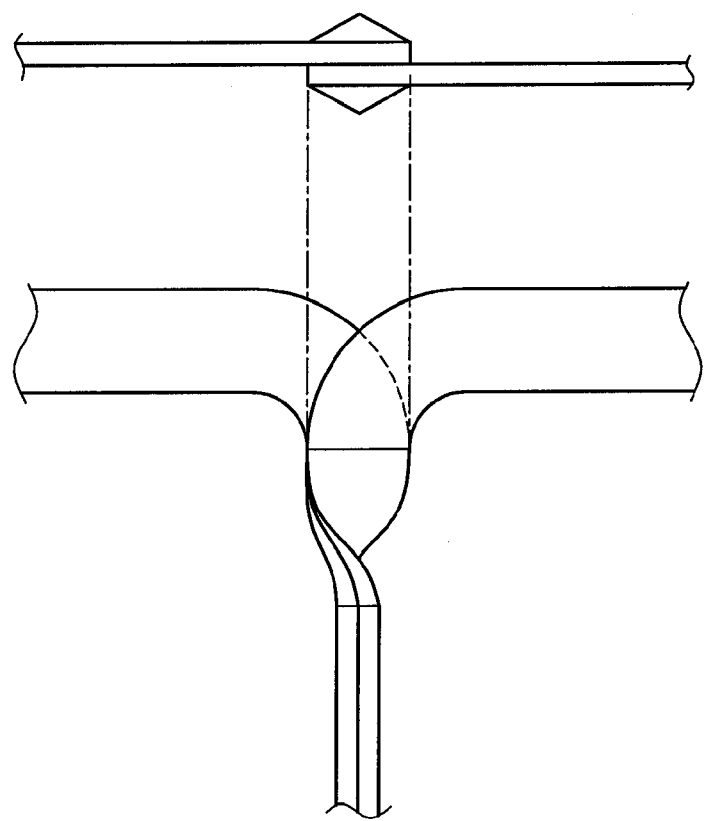
FIG. 21 is a diagram schematically showing a state where bends interfere with each other at coil ends.

Also in the embodiment described above, the second bends EL2 and ER2 on the lead side are formed by tilting after the twisting process so as to make the lane portion in one layer at coil ends. The lane portion can be made in one layer also by pulling the circumferential portions E to left and right as shown in FIG. 20. In this case, however, the vicinity of the twisted portion may be subjected to an excessive force and there is a possibility that the enamel coat of the conductor may be damaged, which will cause a large drop in the insulation performance.

Further, while the second bends EL2 and ER2 on the lead side are formed by tilting after the twisting process, the second bends EL2 and ER2 may be formed by bending before the twisting process as with the non-lead side, i.e., the first bends EL1 and ER1 and second bends EL2 and ER2 may both be formed by edgewise bending in two steps.

In the above embodiment, in the twisting process, the in-slot target portions are twisted while the two conductor blanks are overlapped. Instead thereof, the conductor blanks may be twisted separately.

While each in-slot target portion S in the above embodiment includes four rectangular conductors (UASX, UASY, UCSX, UCSY) overlapped one after another, each portion S may be configured by overlapping two rectangular conductors (UASX, UCSX) so that the conductor UA and the conductor UC are offset by one pitch. Further, each of the conductors UA and UC may be made up of three conductors to overlap six portions (UASX, UASY, UASZ, UCSX, UCSY, UCSZ) one after another. As another alternative, each of the conductors UA and UC may be made up of four conductors to overlap eight portions (UASX, UASY, UASZ, UASZZ, UCSX, UCSY, UCSZ, UCSZZ) one after another. A single in-slot target portion (UASX) may also be arranged.

In the above embodiment, the twisting target portions HM and HN are formed as a curved surface. These may be formed in a flat surface with a stepped portion.

Further, each circumferential portion E has the shape of an original conductor but may be made thinner than the original shape by press. In this case where each circumferential portion E is pressed to be thinner, the size of the stator in a radial direction can be reduced.

Although the above embodiment omits the explanation of a process for molding the stator assembly, the stator assembly shown in FIG. 18 may be molded with resin to complete a stator.

REFERENCE SIGNS LIST

10 Stator
E Circumferential portion
EL, ER Bent portion
EL1, ER1 First bend
EL2, ER2 Second bend
G Three-phase coil
HM, HN Twisting target portion
S In-slot target portion
UA, UB, UC, UD U-phase conductor
UAC First U-phase conductor assembly
UBD Second U-phase conductor assembly
VA, VB, VC, VD V-phase conductor
VAC First V-phase conductor assembly
VBD Second V-phase conductor assembly
WA, WB, WC, WD W-phase conductor
WAC First W-phase conductor assembly
WBD Second W-phase conductor assembly

The invention claimed is:

1. A stator comprising a coil formed of a conductor having a rectangular cross section, wherein
the conductor is formed in a continuous meandering fashion,
the conductor including:
a plurality of in-slot portions arranged inside a slot of the stator such as to be overlapped with one another in a circumferential direction of the stator;
a plurality of circumferential portions arranged at a coil end such as to be overlapped with one another in the radial direction of the stator;
a bent portion connecting the in-slot portion and the circumferential portion; and
a twisted portion formed at each of both ends of each in-slot portion by twisting the conductor so that the in-slot portions are arranged and overlapped with one another in close contact in the circumferential direction of the stator and a long side direction of the conductor corresponds to a radial direction of the stator, and so that a short side of the conductor is visible in the radial direction of the stator,
the bent portion including a first bend formed by bending the conductor in a circumferential direction of the stator on a side of the circumferential portion and a second bend formed by bending the conductor in the circumferential direction of the stator on a side of the in-slot portion, and
the bent portion located on both sides of the in-slot portion being formed so that the first bend and the second bend at one coil are bent in an opposite direction to a first bend and a second bend at the other coil end in order for a shape of the coil to be formed as a waived winding.

2. The stator according to claim 1, wherein
the first bend is formed so that a bending angle $\theta1$ is $\theta1<90°$, and the bending angle $\theta1$ and a bending angle $\theta2$ of the second bend satisfy a relationship of $\theta1+\theta2=90°$.

3. The stator according to claim 1, wherein the second bend at one coil end is formed by tilting down the bent portion toward the stator after the twisted portion has been formed.

4. The stator according to claim 1, wherein the second bend at the other coil end is formed by bending the conductor edgewise before the twisted portion is formed.

5. A method for manufacturing a stator comprising a coil formed of a conductor having a rectangular cross section, the method comprising the steps of:
bending the conductor edgewise at an angle smaller than 90° in a circumferential direction of the stator; and
twisting a portion of the conductor that has undergone the bending step and is to be positioned inside a slot of the stator so that a plurality of the portions are arranged and overlapped with one another in close contact in the circumferential direction of the stator and a long side direction of the conductor corresponds to a radial direction of the stator, and so that a short side of the conductor is visible in the radial direction of the stator,
the bending step including edgewise bending a portion of the conductor that is positioned at least at one coil end in two steps in a circumferential direction of the stator so that the portion of the conductor is oriented in an opposite direction to the bending direction of a portion that is positioned at the other coil end in order for a shape of the coil to be formed as a waived winding.

6. The method for manufacturing a stator according to claim 5, wherein
the bending step includes edgewise bending the portion of the conductor positioned at one coil end in one step, and the method further includes the step of tilting down an end of the twisted portion of the conductor that has undergone the twisting step and is positioned at one coil end.

7. The method for manufacturing a state according to claim 5, wherein the twisting step includes twisting a plurality of the conductors having undergone the bending step, at the same time with their twisted portions aligned with each other.

* * * * *